(12) United States Patent
Hsieh

(10) Patent No.: US 11,269,443 B2
(45) Date of Patent: Mar. 8, 2022

(54) METHOD FOR DISTINGUISHING TOUCH INPUTS ON DISPLAY FROM FUNCTION OF RECOGNIZING FINGERPRINT AND ELECTRONIC DEVICE EMPLOYING METHOD

(71) Applicant: Chiun Mai Communication Systems, Inc., New Taipei (TW)

(72) Inventor: Jung-Feng Hsieh, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 29 days.

(21) Appl. No.: 16/999,219

(22) Filed: Aug. 21, 2020

(65) Prior Publication Data

US 2021/0055820 A1    Feb. 25, 2021

(30) Foreign Application Priority Data

Aug. 22, 2019  (CN) .......................... 201910779196.1

(51) Int. Cl.
*G06F 3/041* (2006.01)
*G06K 9/00* (2006.01)

(52) U.S. Cl.
CPC ....... *G06F 3/0416* (2013.01); *G06K 9/00013* (2013.01); *G06K 9/00926* (2013.01)

(58) Field of Classification Search
CPC .. G06F 3/0416; G06F 3/041661; G06F 21/32; G06K 9/00013; G06K 9/00926
See application file for complete search history.

(56) References Cited

U.S. PATENT DOCUMENTS

| 2013/0053107 | A1* | 2/2013 | Kang | H04M 1/0266 455/566 |
| 2015/0040243 | A1* | 2/2015 | Mittal | G06F 21/554 726/27 |
| 2015/0071511 | A1* | 3/2015 | Wang | G06K 9/0002 382/124 |

* cited by examiner

*Primary Examiner* — Abhishek Sarma
(74) *Attorney, Agent, or Firm* — ScienBiziP, P.C.

(57) ABSTRACT

A method for distinguishing between touches intended as commands on a display screen and fingertip presentation for fingerprint recognition, applied to an electronic device, includes: (Step 1) detecting a touched area of a touch event on a display screen; (Step 2) determining whether an area size of the touched area is greater than a predetermined threshold; (Step 3) when the area size of the touched area is smaller than the predetermined threshold, determining that the touch event is a touch operation and executing a corresponding function; and (Step 4) when the area size of the touched area is greater than the predetermined threshold, determining that the touch event is for fingerprint recognition, detecting the fingerprint input by the fingerprint sensor and executing a function corresponding to the fingerprint presentation and recognition.

20 Claims, 4 Drawing Sheets

METHOD FOR DISTINGUISHING TOUCH INPUTS ON DISPLAY FROM FUNCTION OF RECOGNIZING FINGERPRINT AND ELECTRONIC DEVICE EMPLOYING METHOD

FIELD

The subject matter relates to data security.

BACKGROUND

Mobile phones can be equipped with fingerprint sensors for identifying fingerprints for specific functions. In some electronic devices, the fingerprint sensor is installed under a touch display screen. However, when the region of the display screen corresponding to the fingerprint sensor receives a user's touch, the user touch can be confused with the desire for fingerprint recognition, which may lead to misoperations.

Therefore, there is room for improvement within the art.

BRIEF DESCRIPTION OF THE DRAWINGS

Many aspects of the disclosure can be better understood with reference to the figures. The components in the figures are not necessarily drawn to scale, the emphasis instead being placed upon clearly illustrating the principles of the disclosure.

DETAILED DESCRIPTION

Figure 1:
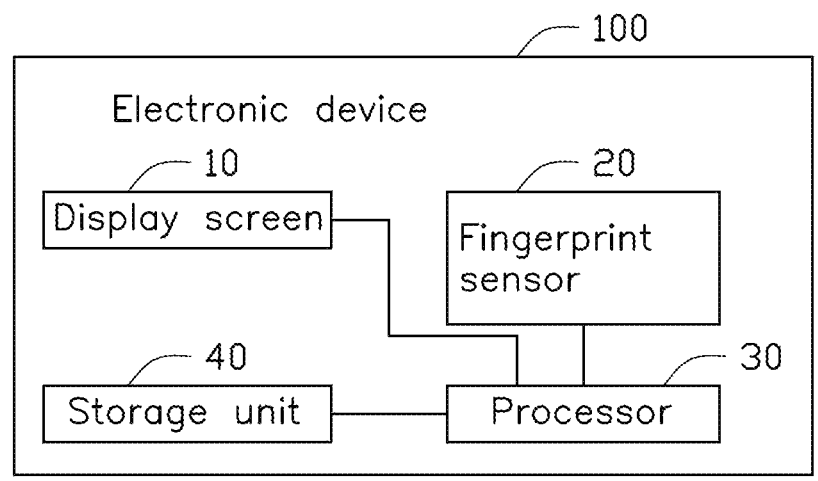
FIG. 1 is a block diagram of an electronic device according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates an electronic device 100 including a display screen 10, a fingerprint sensor 20, a processor 30, and a storage unit 40. The electronic device 100 may be a mobile phone, a tablet computer, a PDA, or the like. The processor 30 is electrically connected to electronic components of the electronic device 100 and processes data and information transmitted from the electronic components.

The display screen 10 displays a user interface and can receive user commands in the form of touches. In this embodiment, the display screen 10 may be a touch display screen.

The fingerprint sensor 20 can detect user fingerprints. The fingerprint sensor 20 corresponds to the display screen 10. In this embodiment, the fingerprint sensor 20 is an under-screen fingerprint sensor. The fingerprint sensor 20 detects fingerprints that are applied to a region on the display screen 10. In this embodiment, the region is a specific region on the display screen 10 corresponding to the fingerprint sensor 20. The fingerprint sensor 20 may be, but is not limited to, an optical sensor or an ultrasonic sensor.

The processor 30 can determine that a touch event received by the display screen 10 is either a touch operation or a fingerprint-recognition input. The processor 30 can further execute a function according to the determination.

Figure 2:
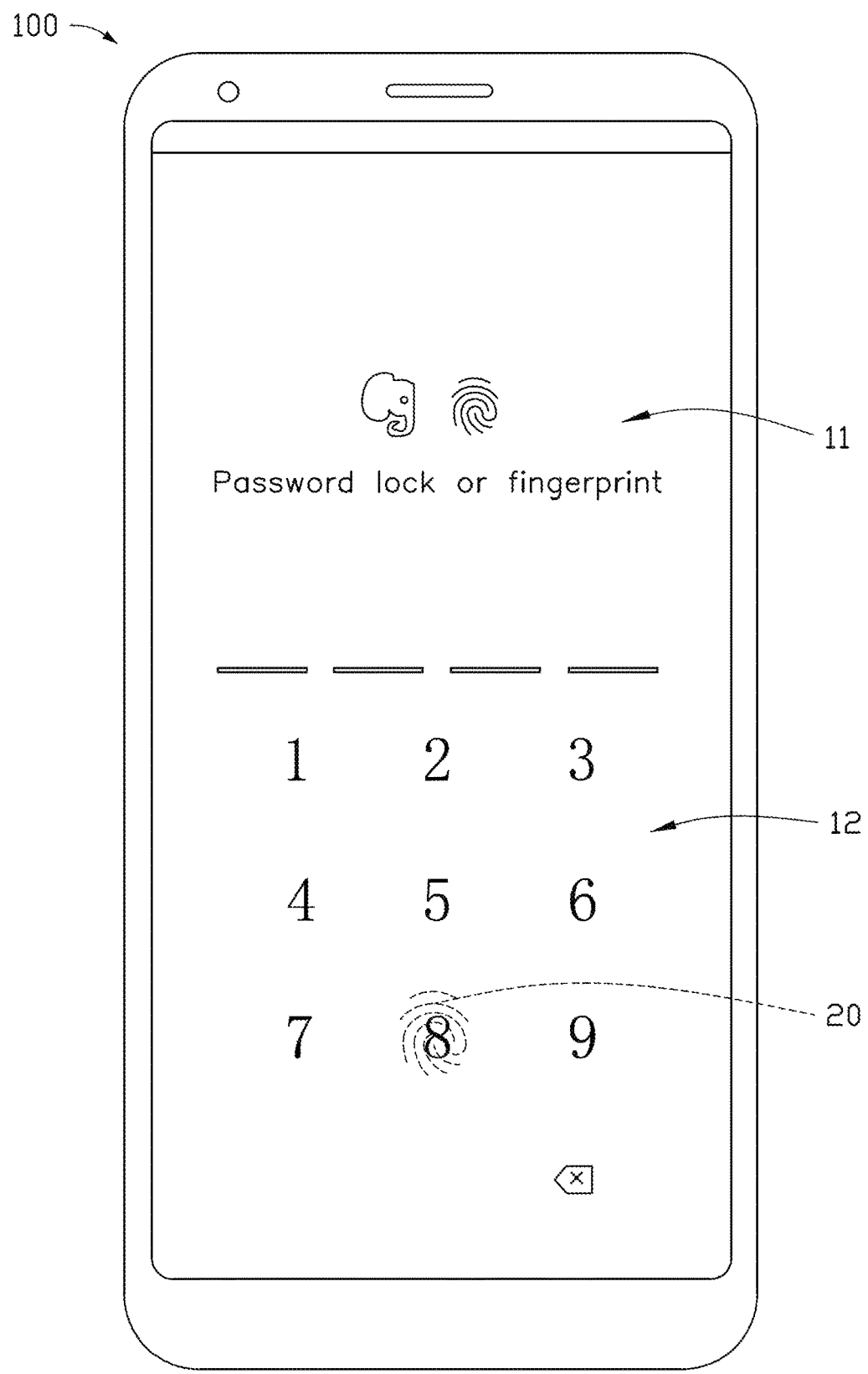
FIG. 2 is a schematic diagram of a user interface displayed by an electronic device according to an embodiment of the present disclosure.

As illustrated in FIG. 2, the display screen 10 displays an operation interface 11. The operation interface 11 includes a virtual keyboard 12. In this embodiment, a specific region or a specific key position of the virtual keyboard 12, such as the key position "8", corresponds to the fingerprint sensor 20. When the specific region or the specific key receives a touch event, the processor 30 can determine that the touch event is either a simple touch operation or an input for fingerprint-recognition. When the touch event is determined to be a simple touch operation, the processor 30 further executes the function corresponding to the specific key "8". When the touch event is determined to be for purpose of fingerprint-recognition, the processor 30 further controls the fingerprint sensor 20 to receive fingerprint information.

Figure 3:
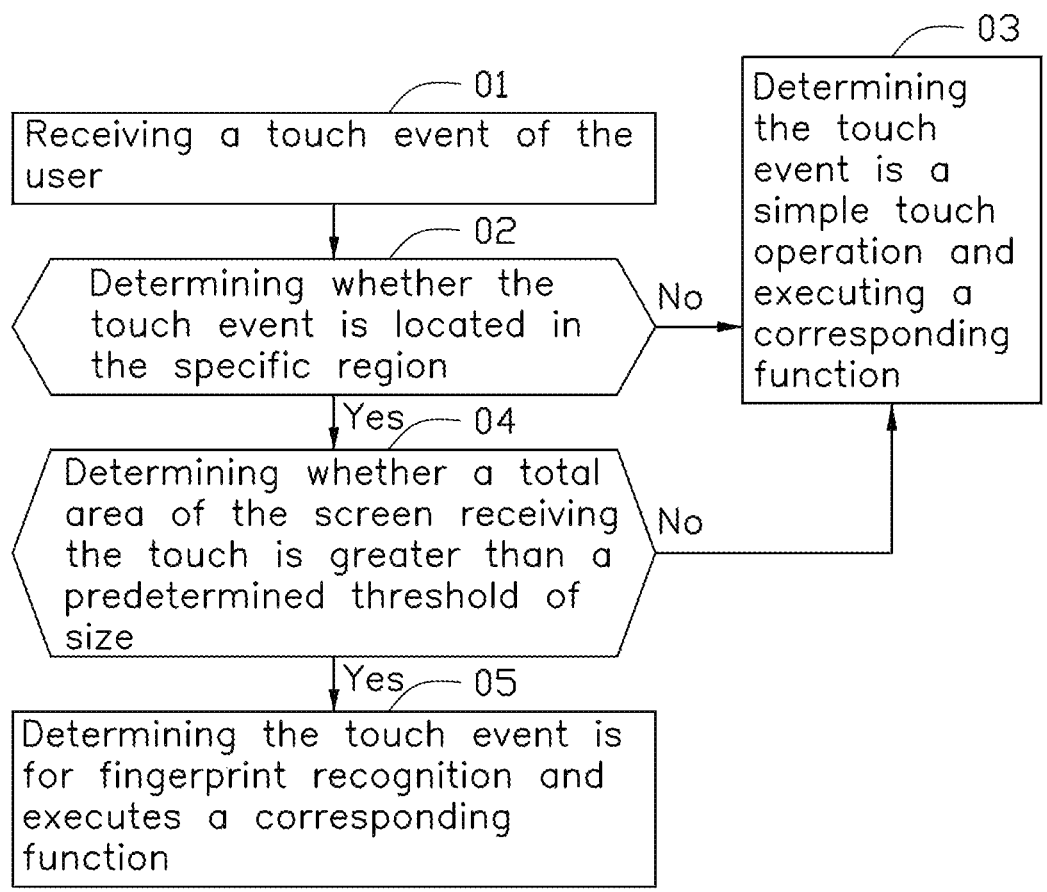
FIG. 3 is a flowchart of a method applied to an electronic device for distinguishing a fingerprint recognition operation on a display screen of the electronic device, according to an embodiment of the present disclosure.

FIG. 3 illustrates a flowchart of a method for distinguishing between simple touches and touches for fingerprint recognition applied to the electronic device 100. The method is provided by way of example, as there are a variety of ways to carry out the method. Each block shown in FIG. 3 represents one or more processes, methods, or subroutines which are carried out in the example method. Furthermore, the order of blocks is illustrative only and additional blocks can be added or fewer blocks may be utilized without departing from the scope of this disclosure.

At block 01, the display screen 10 receives a touch event from the user.

In this embodiment, the fingerprint sensor 20 is set to correspond to a certain region on the display screen 10, and such region is defined as a specific region.

At block 02, the processor 30 determines whether the touch event is located in the specific region.

In this embodiment, when the processor 30 determines that the touch event is not located in the specific region, block 03 is executed. When the processor 30 determines that the touch event is located in the specific region, block 04 is executed.

At block 03, the processor 30 determines that the touch event is a simple touch operation and executes a function corresponding to such touch.

At block 04, the processor 30 determines whether a total area of the screen receiving the touch is greater than a predetermined threshold of size.

In this embodiment, the display screen 10 detects an area size of the touched area of the touch in the specific region. The processor 30 compares the touched area with the predetermined threshold. When the processor 30 determines that the area size of the touched area is smaller than the predetermined threshold, block 03 is executed: When the processor 30 determines that the area size of the touched area is greater than the predetermined threshold, block 05 is executed.

At block 05, the processor 30 determines that the touch event is for fingerprint recognition and executes a corresponding function.

In this embodiment, the fingerprint sensor 20 detects fingerprint information.

Figure 4:
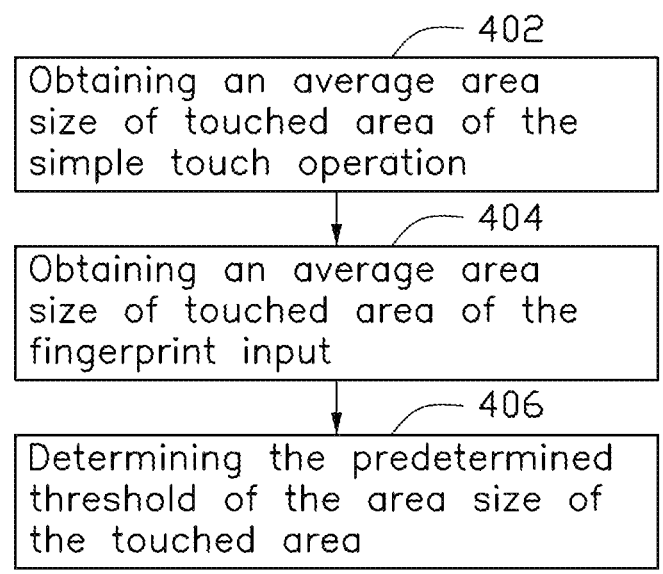
FIG. 4 is a flowchart of a method for determining a predetermined fingerprint recognition threshold in an electronic device, according to an embodiment of the present disclosure.

In this embodiment, as illustrated in FIG. 4, the method for distinguishing fingerprint recognition purpose further includes a method of determining the predetermined threshold of the area size of the touched area, the method of determining such predetermined threshold of the area size includes the following blocks:

At block 402, an average area size of a touched area of the simple touch operation is obtained.

In this embodiment, the display screen 10 displays instruction information when the electronic device 100 is turned on for a first time. Each item of instruction information includes a next page button for the user to touch to turn the page. The processor 30 records the area size of the touched area of each t operation operated on the next page button. The processor 30 further calculates an average area size of touched area n of the simple touch operation.

That is, in block 402, the touched area of the touch operation needs to be captured or acquired at least one time, and then the average touched area n of the touch operation is calculated.

At block 404, an average area size of a touched area of at the fingerprint input is obtained.

In this embodiment, the display screen 10 displays a registration page when the electronic device 100 is to perform fingerprint registration. The registration page includes at least one indication regions to receive the fingerprint. The processor 30 records the area size of the touched area of each operation operated on the indication region. The processor 30 further calculates an average area size m of touched area of the fingerprint input.

That is, in block 404, the touched area in relation to fingerprint input needs to be captured or acquired at least one time, and then the average touched area m of the fingerprint input is calculated.

At block 406, the predetermined threshold of the area size of the touched area is determined.

In this embodiment, the processor 30 calculates an average value X of the area size of touched area n of the simple touch operation, and the average area size of touched area m of the fingerprint input. In this embodiment, the average value X is the predetermined threshold. A formula for calculating the average value X may be $X=(n+m)/2$.

In this embodiment, the method for determining the predetermined threshold of size is often in relation to one finger only. In other embodiments, the method for fingerprint recognition can also be applied to different areas of contact or areas of touch for different fingers, or for both. For example, the method for fingerprint recognition firstly determines the predetermined thresholds corresponding to different fingers in sequence according to the method of determining the predetermined threshold of the size shown in FIG. 4. Then, the various predetermined thresholds corresponding to various fingers are stored in the storage unit 40 shown in FIG. 1. Next, the method for fingerprint recognition executes blocks 01, 02, and 03.

Before executing block 04, the processor 30 first determines the finger which is being used to perform the touch event, and then retrieves the predetermined threshold of the area size corresponding to such fingerprint from the storage unit 40. The processor 30 further compares the touched area of the touch event with the predetermined threshold of the area size of the touched area of the relevant finger, and then the corresponding block 03 or 05 is executed.

The method for distinguishing input for fingerprint recognition of the electronic device 100 of the present disclosure detects the touched area of a touch on a specific region of the fingerprint sensor 20 on the display screen 10, and determines whether the touch is a simple touch operation or input for fingerprint recognition by comparison with a predetermined threshold. The method for distinguishing between touches accurately determines a type of the touch, which makes human-computer interaction more friendly and provides a better user experience.

It is believed that the embodiments and their advantages will be understood from the foregoing description, and it will be apparent that various changes may be made thereto without departing from the scope of the disclosure or sacrificing all of its advantages, the examples hereinbefore described merely being illustrative embodiments of the disclosure.

What is claimed is:

1. An electronic device, the electronic device comprising a display screen, a fingerprint sensor, a storage unit, and at least one processor, the electronic device comprising a plurality of function units stored in the storage unit and causing the at least one processor to:
    (a) detect a touched area of a touch event on the display screen;
    (b) determine whether an area size of the touched area being greater than a predetermined threshold;
    (c) when the area size of the touched area is smaller than the predetermined threshold, determine the touch event is a simple touch operation and execute a corresponding function; and
    (d) when the area size of the touched area is greater than the predetermined threshold, determine the touch event is a fingerprint input, detect the fingerprint input by the fingerprint sensor and execute a function corresponding to the fingerprint input.

2. The electronic device of claim 1, wherein before step (a), the at least one processor further:
    determines whether the touch event is located in a specific region;
    determines the touch event being the simple touch operation and executes the corresponding function, when the touch event is not located in the specific region; and
    executes step (b), when the touch event is located in the specific region.

3. The electronic device of claim 2, wherein the specific region is a region on the display screen corresponding to the fingerprint sensor being positioned under the display screen, the fingerprint sensor detects fingerprint input in the specific region.

4. The electronic device of claim 3, wherein the at least one processor further:
    obtains an average area size of touched area of the simple touch operation;

obtains an average area size of touched area of the fingerprint input;

calculates an average value of area size of touched area of the simple touch operation and the average area size of touched area of the fingerprint input to determine the predetermined threshold of the area size of the touched area.

5. The electronic device of claim 4, wherein the touched area of the simple touch operation is acquired at least one time, and the touched area of the fingerprint input is acquired at least one time.

6. The electronic device of claim 4, wherein the at least one processor further:

displays instruction information when the electronic device is turned on for a first time, wherein each item of instruction information comprises a next page button;

records the area size of the touched area of each operation operated on the next page button; and calculates the average area size of touched area of the simple touch operation.

7. The electronic device of claim 4, wherein the at least one processor further:

displays a registration page when the electronic device performs a fingerprint registration, wherein the registration page comprises at least one indication region to receive the fingerprint input;

records the area size of the touched area of each operation operated on the indication region; and calculates the average area size of touched area of the fingerprint input.

8. The electronic device of claim 7, wherein the average touched area of the fingerprint input is touched by different fingers.

9. The electronic device of claim 8, wherein the at least one processor further:

determines the predetermined threshold of the area size corresponding to different fingers in sequence;

determines the finger which is being used to perform the touch event;

retrieves the predetermined threshold of the area size corresponding to the finger;

compares the touched area of the touch event with the predetermined threshold of the area size of the touched area of the relevant finger, and then executes step (b) or (c).

10. The electronic device of claim 8, wherein the at least one processor further:

stores the predetermined threshold of the area size of the touched area of the relevant finger.

11. An under-screen fingerprint distinguishing method applied to an electronic device comprising a display screen and a fingerprint sensor, the fingerprint sensor being positioned under the display screen, the method comprising:

(a) detecting a touched area of a touch event on the display screen;

(b) determining whether an area size of the touched area being greater than a predetermined threshold;

(c) when the area size of the touched area being smaller than the predetermined threshold, determining the touch event being a simple touch operation and executing a corresponding function; and (d) when the area size of the touched area being greater than the predetermined threshold, determining the touch event being a fingerprint input, detecting the fingerprint input by the fingerprint sensor and executing a function corresponding to the fingerprint input.

12. The method of claim 11, wherein before step (a), the method further comprises:

determining whether the touch event is located in a specific region;

determining the touch event being the simple touch operation and executing the corresponding function, when the touch event is not located in the specific region; and executing step (b), when the touch event is located in the specific region.

13. The method of claim 12, wherein the specific region is a region on the display screen corresponding to the fingerprint sensor being positioned under the display screen, the fingerprint sensor detects fingerprint input in the specific region.

14. The method of claim 13, further comprising a method of determining the predetermined threshold of the area size of the touched area, comprising:

obtaining an average area size of touched area of the simple touch operation;

obtaining an average area size of touched area of the fingerprint input;

calculating an average value of the area size of touched area of the simple touch operation and the average area size of touched area of the fingerprint input to determine the predetermined threshold of the area size of the touched area.

15. The method of claim 14, wherein the touched area of the simple touch operation is acquired at least one time, and the touched area of the fingerprint input is acquired at least one time.

16. The method of claim 14, wherein the method of determining the predetermined threshold of the area size of the touched area further comprises:

displaying instruction information when the electronic device is turned on for a first time, wherein each item of instruction information comprises a next page button;

recording the area size of the touched area of each operation operated on the next page button; and calculating the average area size of touched area of the simple touch operation.

17. The method of claim 14, wherein the method of determining the predetermined threshold of the area size of the touched area further comprises:

displaying a registration page when the electronic device performs a fingerprint registration, wherein the registration page comprises at least one indication region to receive the fingerprint input;

recording the area size of the touched area of each operation operated on the indication region; and calculating the average area size of touched area of the fingerprint input.

18. The method of claim 17, wherein the average touched area of the fingerprint input is touched by different fingers.

19. The method of claim 18, further comprising:

determining the predetermined threshold of the area size corresponding to different finger in sequence;

determining the finger which is being used to perform the touch event;

retrieving the predetermined threshold of the area size corresponding to the finger;

comparing the touched area of the touch event with the predetermined threshold of the area size of the touched area of the relevant finger, and then executing step (b) or (c).

20. The method of claim 19, further comprising:
storing the predetermined threshold of the area size of the touched area of the relevant finger.

\* \* \* \* \*